(12) United States Patent
Mai

(10) Patent No.: US 7,762,802 B2
(45) Date of Patent: Jul. 27, 2010

(54) MOLD INSERT STACK FOR USE IN AN INJECTION MOLD AND A COUPLER THEREOF

(75) Inventor: Arnold Mai, Irrel (DE)

(73) Assignee: Husky Injection Molding Systems, Ltd., Bolton, Ontario (CA)

( * ) Notice: Subject to any disclaimer, the term of this patent is extended or adjusted under 35 U.S.C. 154(b) by 415 days.

(21) Appl. No.: 12/034,755

(22) Filed: Feb. 21, 2008

(65) Prior Publication Data

US 2009/0214694 A1 Aug. 27, 2009

(51) Int. Cl.
*B29C 45/17* (2006.01)

(52) U.S. Cl. .................. 425/190; 425/525; 425/542

(58) Field of Classification Search .............. 425/451.9, 425/525, 533, 556, 577, DIG. 58, 190; 264/318
See application file for complete search history.

(56) References Cited

U.S. PATENT DOCUMENTS

| | | | | |
|---|---|---|---|---|
| 4,571,171 | A * | 2/1986 | Blank et al. | 425/533 |
| 5,736,173 | A * | 4/1998 | Wright et al. | 425/577 |
| 6,176,700 | B1 * | 1/2001 | Gellert | 425/547 |
| 6,203,310 | B1 * | 3/2001 | Matysek | 425/547 |
| 6,413,075 | B1 * | 7/2002 | Koch et al. | 425/526 |
| 6,488,881 | B2 * | 12/2002 | Gellert | 264/328.16 |
| 6,497,569 | B2 * | 12/2002 | Koch et al. | 425/548 |
| 6,569,370 | B1 * | 5/2003 | Amin et al. | 264/219 |
| 6,739,860 | B2 * | 5/2004 | Muller | 425/182 |
| 6,840,756 | B2 | 1/2005 | Coel et al. | |

(Continued)

FOREIGN PATENT DOCUMENTS

CA 2256090 C 6/2000

(Continued)

*Primary Examiner*—Yogendra N Gupta
*Assistant Examiner*—Emmanuel S Luk
(74) *Attorney, Agent, or Firm*—Husky Intellectual Property Services

(57) ABSTRACT

There is disclosed a mold insert stack for use in an injection mold and a coupler thereof. The mold insert stack for use in an injection mold is provided and comprises a core assembly that includes: a core insert that includes: a core body; an inner molding surface that is defined on the core body, the inner molding surface provides, in use, an inner portion of a molding cavity that is shaped to mold a preform; a core-coupler interface that is defined on the core body; a support member that includes: a support body; a support-sliding interface that is defined on the support body; a coupler member that includes: a coupler body; a coupler-core interface that is defined on the coupler body; a coupler-insert interface that is defined on the coupler body; and a complementary sliding interface that is defined on at least one of the coupler body and the core body; the coupler-core interface and the core-coupler interface being configured to cooperate, in use, to mutually locate the coupler body with the core body; the coupler-insert interface being configured to cooperate, in use, with a complementary interface defined on a further mold insert; the support-sliding interface and the complementary sliding interface being configured to cooperate, in use, to establish a slidable coupling that is able to accommodate, in use, a lateral move (S1) between the support-sliding interface and the complementary sliding interface and connect a load path between the support body with at least one of the core body with the coupler body.

32 Claims, 3 Drawing Sheets

U.S. PATENT DOCUMENTS

| | | | |
|---|---|---|---|
| 7,086,848 B2 * | 8/2006 | Bischer et al. | 425/192 R |
| 7,377,767 B2 * | 5/2008 | Dubuis et al. | 425/547 |
| 7,381,049 B2 * | 6/2008 | Li et al. | 425/537 |
| 7,503,542 B2 * | 3/2009 | Uratani | 249/103 |
| 7,575,429 B2 * | 8/2009 | Mai et al. | 425/577 |
| 7,588,439 B2 * | 9/2009 | Mai et al. | 425/577 |
| RE40,952 E * | 11/2009 | Olaru | 264/40.6 |
| 7,628,605 B2 * | 12/2009 | Mai et al. | 425/577 |
| 7,645,132 B2 * | 1/2010 | McCready | 425/192 R |
| 2001/0016239 A1 * | 8/2001 | Koch et al. | 428/35.7 |
| 2005/0136150 A1 | 6/2005 | Martin | |
| 2008/0008778 A1 | 1/2008 | Niewels | |
| 2008/0265463 A1 * | 10/2008 | Finkelstein | 264/320 |
| 2009/0011070 A1 * | 1/2009 | Li et al. | 425/556 |
| 2009/0061043 A1 * | 3/2009 | Fisch et al. | 425/577 |

FOREIGN PATENT DOCUMENTS

| | | |
|---|---|---|
| WO | 0189797 A1 | 11/2001 |
| WO | WO-2007093032 | 8/2007 |

* cited by examiner

MOLD INSERT STACK FOR USE IN AN INJECTION MOLD AND A COUPLER THEREOF

FIELD OF THE INVENTION

The present invention generally relates to, but is not limited to, injection molding, and more specifically the present invention relates to, but is not limited to, a mold insert stack for use in an injection mold and a coupler of the mold insert stack.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes an injection unit, a clamp assembly and an injection mold. The injection unit can be, for example, of a reciprocating screw type or of a two-stage type. The clamp assembly includes, inter alia, a frame, a movable platen, a fixed platen and an actuator for moving the movable platen and to apply tonnage to the injection mold arranged between the platens. The injection mold includes, inter alia, a cold half and a hot half with one or more mold insert stacks disposed therein. Each mold insert stack typically includes a core insert and a cavity insert that cooperate, in use, to define a molding cavity. However, each mold insert stack can be associated with a number of additional components such as, for example, a split mold insert pair (sometimes referred to as neck rings), a gate insert, a retainer, or a support member. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The hot half can also be associated with a melt distribution system (also referred to sometimes by those of skill in the art as a "hot runner") for melt distribution. The injection mold can be associated with a number of additional components, such as slides for positioning of the split mold insert pair, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities to form preforms. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

One common example of a molded article that can be formed is a preform of the type that is capable of being subsequently blown into a beverage container, such as, a bottle and the like.

SUMMARY OF THE INVENTION

According to a first broad aspect of the present invention, there is provided a mold insert stack for use in an injection mold. The mold insert stack includes a core assembly that includes a core insert, a support member, and a coupler member. The core insert includes a core body, an inner molding surface defined on the core body, and a core-coupler interface defined on the core body. The inner molding surface provides, in use, an inner portion of a molding cavity that is shaped to mold a preform. The support member includes a support body, and a support-sliding interface defined on the support body. The coupler member includes a coupler body, a coupler-core interface defined on the coupler body, and a coupler-insert interface defined on the coupler body. The mold insert stack further includes a complementary sliding interface defined on at least one of the coupler body and the core body. The coupler-core interface and the core-coupler interface being configured to cooperate, in use, to mutually locate the coupler body with the core body. The coupler-insert interface being configured to cooperate, in use, with a complementary interface defined on a further mold insert. The support-sliding interface and the complementary sliding interface being configured to cooperate, in use, to establish a slidable coupling that is able to accommodate, in use, a lateral move between the support-sliding interface and the complementary sliding interface and connect a load path between the support body with at least one of the core body with the coupler body.

According to a second broad aspect of the present invention, there is provided a coupler member of a mold insert stack for use in an injection mold. The coupler member includes a coupler body. A coupler-core interface is defined on the coupler body. A coupler-insert interface defined on the coupler body, and a coupler-support interface is defined on the coupler body. The coupler-support interface provides at least a portion of a complementary sliding interface. The coupler-core interface and a core-coupler interface, defined on a core body of a core insert, being configured to cooperate, in use, to mutually locate the coupler body with the core body. The coupler-insert interface being configured to cooperate, in use, with a complementary interface defined a further mold insert. The coupler-support interface and a support-core interface, defined on a support body of a support member, being configured to cooperate, in use, to establish a slidable coupling that is able to accommodate, in use, a lateral move between the coupler-support interface and the support-core interface and connect a load path between the support body and the coupler body.

A technical effect of the mold insert stack of the present invention may include that it is more robust than those known to the skilled person in the injection molding field.

A further technical effect of the mold insert stack of the present invention may include that the coupler member may be configured to be a sacrificial wearing component to assist in extending the serviceability of the core insert.

These and other aspects and features of embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention includes alternatives and/or variations thereof may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 1:
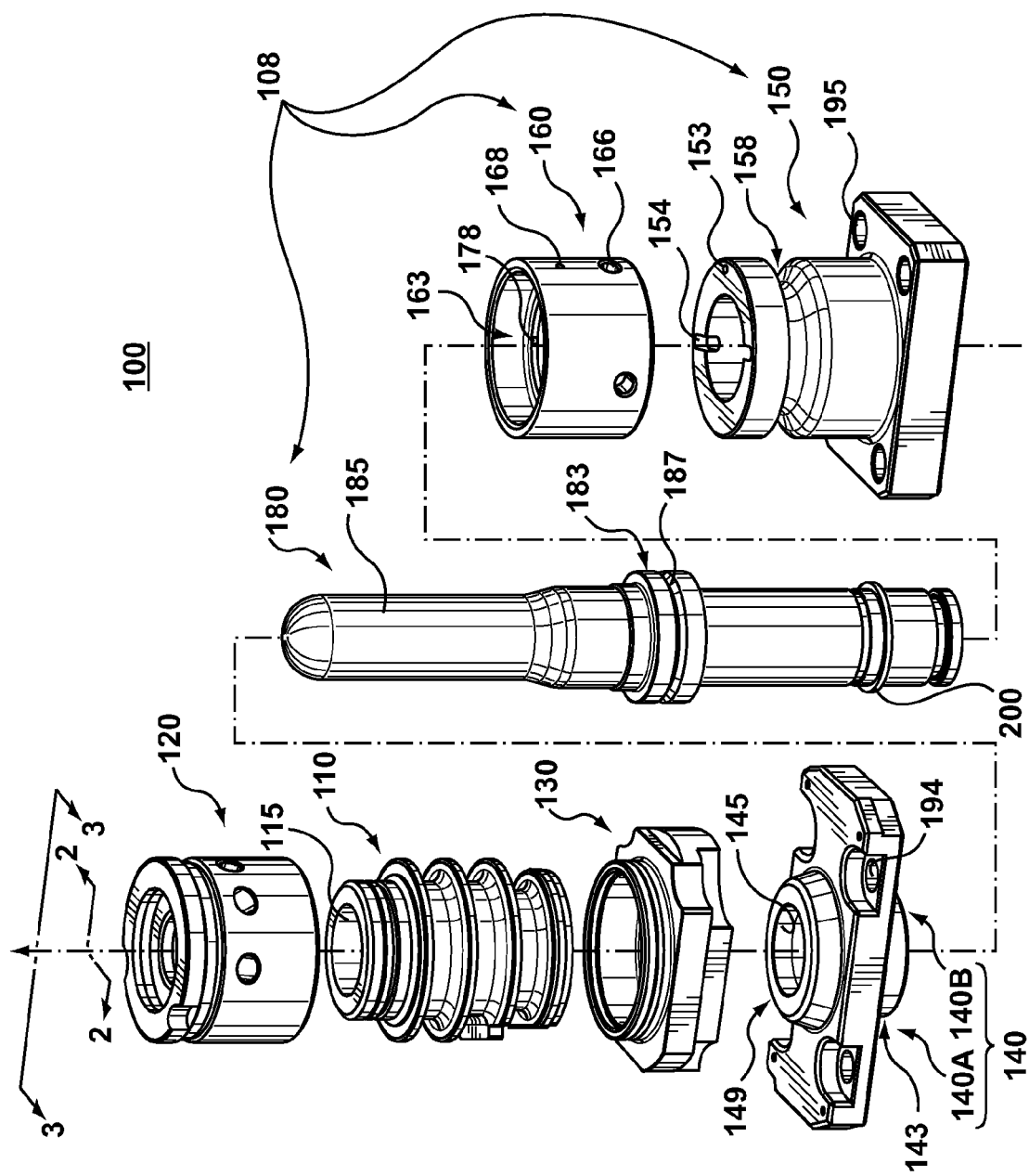
FIG. 1 is a perspective view of a mold insert stack according to a non-limiting embodiment of the present invention.
Figure 2:
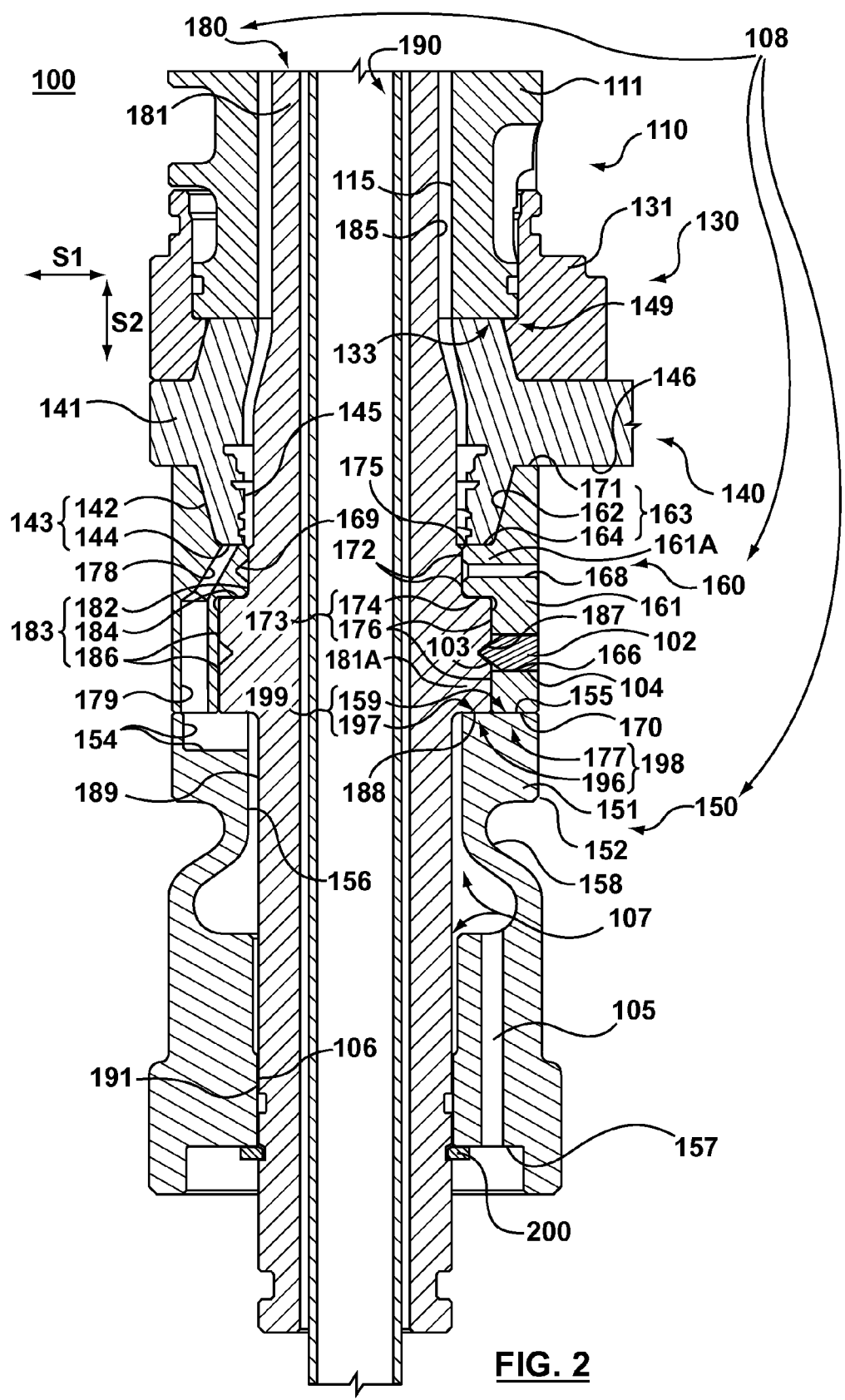
FIG. 2 is a cross-section view of the mold insert stack of FIG. 1 taken along section line 2-2.
Figure 3:
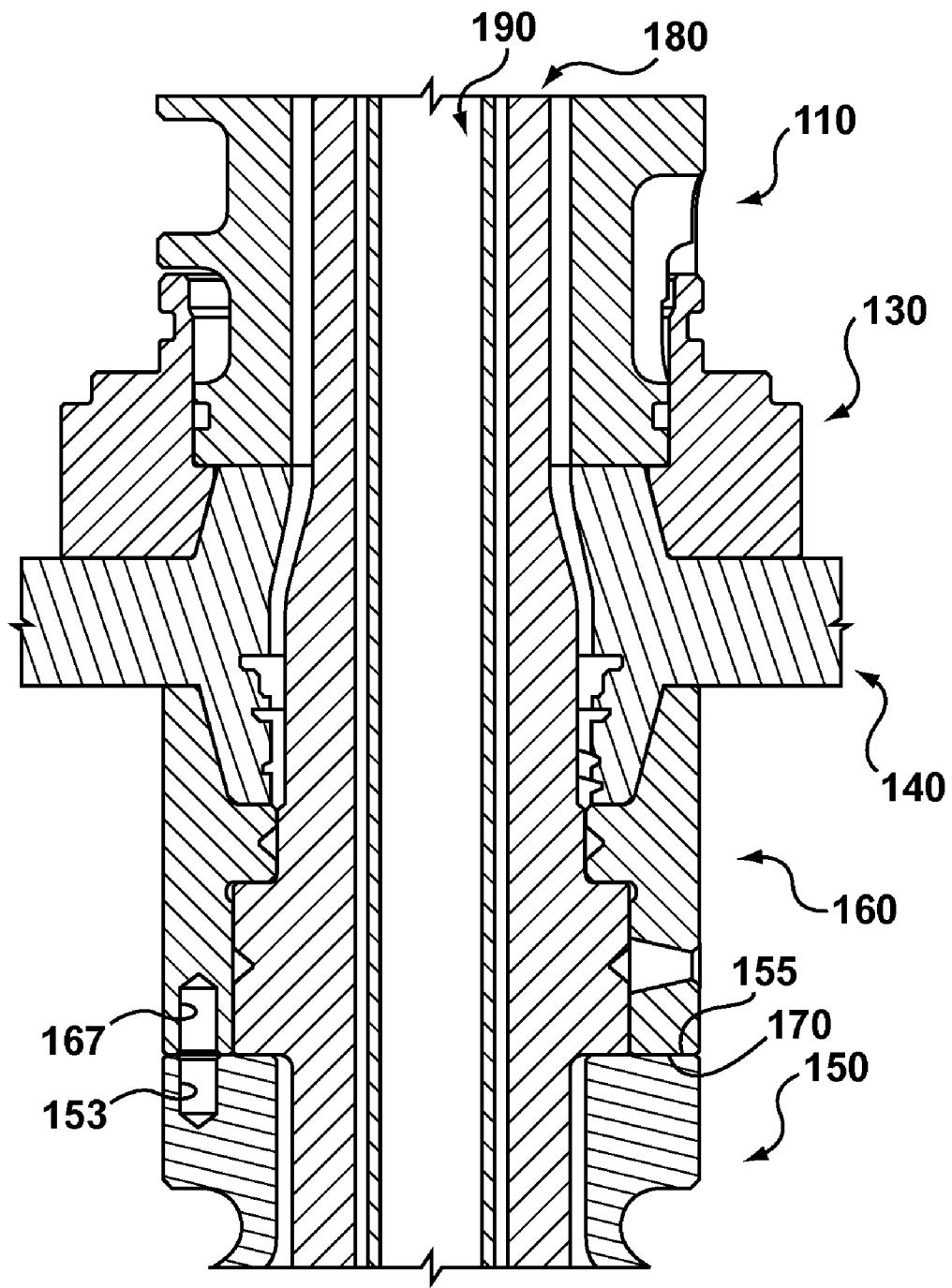
FIG. 3 is a cross-section view of the mold insert stack of FIG. 1 taken along section line 3-3.

With reference to FIGS. 1, 2, and 3, a mold insert stack is shown that has been configured in accordance with a non-limiting embodiment of the present invention. The mold insert stack 100 is for use in an injection mold. The mold insert stack 100 includes a core assembly 108, a cavity insert 110, and a split mold insert pair 140. The core assembly 108 includes a core insert 180, a support member 150, and a coupler member 160.

The core insert 180 includes a core body 181. An inner molding surface 185 is defined on the core body 181. In addition, a core-coupler interface 183 is defined on the core body 181. The inner molding surface 185 provides, in use, an inner portion of a molding cavity that is shaped to mold a preform.

The split mold insert pair 140 includes a complementary pair of split mold inserts 140A and 140B. The split mold insert pair 140 include a corresponding pair of split bodies 141. A split molding surface 145 is defined on the pair of split bodies 141. The split molding surface 145 defines a neck finish portion of the molding cavity. A split-coupler interface 143 and a split-cavity interface 149 are also defined on the pair of split bodies 141. A set of fastener interfaces 194 are also defined on the pair of split bodies 141. Each fastener interface of the set of fastener interfaces 194 are configured to cooperate with a fastener, such as, for example, a cap screw, for securing the split mold insert pair 140 to respective slides (not shown) of the injection mold.

The cavity insert 110 includes a cavity body 111. A cavity molding surface 115 and a cavity-insert interface 133, at least in part, are defined on the cavity body 111. The cavity molding surface 115 defines an outer portion of the molding cavity.

The support member 150 includes a support body 151. A support-sliding interface 199 is defined on the support body 151. A set of fastener interfaces 195 are also defined on the support body 151. Each fastener interface of the set of fastener interfaces 195 are configured to cooperate with a fastener, such as, for example, a cap screw, for securing the support member 150 to a core plate (not shown) of the injection mold.

The coupler member 160 includes a coupler body 161. A coupler-core interface 173 and a coupler-insert interface 163 are defined on the coupler body 161.

The mold insert stack 100 further includes a complementary sliding interface 198 that is defined on at least one of the coupler body 161 and the core body 181.

The coupler-core interface 173 and the core-coupler interface 183 are configured to cooperate, in use, to mutually locate the coupler body 161 with the core body 181. The coupler-insert interface 163 and the split-coupler interface 143 are configured to cooperate, in use, to mutually locate the coupler body 161 and the pair of split bodies 141. The split-cavity interface 149 and the cavity-insert interface 133 are configured to cooperate, in use, to mutually locate the pair of split bodies 141 with the cavity body 111. The support-sliding interface 199 and the complementary sliding interface 198 are configured to cooperate, in use, to establish a slidable coupling that is able to accommodate, in use, a lateral move S1 (FIG. 2) between the support-sliding interface 199 and the complementary sliding interface 198 and connect a load path (i.e. clamp tonnage) between the support body 151 with at least one of the core body 181 with the coupler body 161.

As shown with reference to FIG. 1, the mold insert stack 100 may further include a cavity retainer 130. The cavity retainer 130 includes a retainer body 131, the retainer body 131 configured to cooperate, in use, with the cavity body 111 and a cavity plate (not shown) of the injection mold for retaining the cavity body 111 in the cavity plate. As shown with reference to FIG. 2, a further portion of the cavity-insert interface 133 may be defined on the retainer body 131.

Also shown with reference to FIG. 1, the mold insert stack 100 may further include a gate insert 120. A portion of cavity molding surface 115 may be defined in a gate body of the gate insert 120. The gate insert 120 may also define an nozzle interface (not shown) for receiving a nozzle (not shown) of a molding material distribution system (e.g. hot runner).

As shown with reference to any one of FIG. 2, or 3, the mold insert stack 100 may further include a bubbler tube 190 for circulating a coolant fluid within a bore formed within the core body 181.

As shown, the coupler body 161 may have an annular form that includes a collar 161A that projects inwardly from an inner cylindrical surface 176 thereof. The coupler-core interface 173 includes the inner cylindrical surface 176 of the coupler body 161. The coupler-core interface 173 may further include a lower annular face 174 of the collar 161A that is between the inner cylindrical surface 176 and an inside cylindrical surface 172 of the collar 161A.

The core body 181 may have a cylindrical form that includes a flange 181A that projects outwardly from an outer cylindrical surface 189 thereof. The core-coupler interface 183 includes an outside cylindrical surface 186 and a top annular face 184 of the flange 181A.

The coupler member 160 may include a retainer interface 166 that is defined through the coupler body 161 between an outer surface 152 of the coupler body 161 and the inner cylindrical surface 176. Likewise, a core-retainer interface 187 may be defined on the outside cylindrical surface 186 of the flange 181A. The retainer interface 166 is configured to cooperate, in use, with a further interface 104 on a retainer 102 to releasably position a face 103 of the retainer 102 in a securing configuration with respect to the core-retainer interface 187, whereby the retainer 102 secures the coupler member 160 with the core insert 180.

As shown with reference to FIG. 1, a plurality of the retainer interface 166 are defined through the coupler body 161, the plurality of the retainer interface 166 being arranged in an angularly-spaced relation around the coupler body 161. Likewise, a plurality of the core-retainer interface 187 are defined on the outside cylindrical surface 186 of the flange 181A. The plurality of the core-retainer interface 187 are arranged in the same angularly-spaced relation as the plurality of the retainer interface 166 for registering therewith.

As shown, the coupler-insert interface 163 may define a core lock for receiving the split-coupler interface 143 of the split mold insert pair 140. The core lock includes a top annular face 171, a semi-conical surface 162 of the coupler body 161, and an upper annular face 164 of the collar 161A. The semi-conical surface 162 inwardly diverges from the top annular face 171 to define a female taper. Also shown are the complementary surfaces 142, 144, 146 of the pair of split bodies 141 that together define the split-coupler interface 143 in the form of a complementary male taper.

In accordance with another non-limiting embodiment, not shown, the coupler-insert interface 163 may define a cavity lock (not shown) for receiving an alternative configuration (not shown) of the split-coupler interface of the split mold insert pair 140. The cavity lock includes a top annular face, a semi-conical surface, and an upper annular face (not shown) of the coupler body 161 between the semi-conical surface and an outer surface of the coupler body 161. The semi-conical surface of the coupler body 161 outwardly diverges from the top annular face 171 to define a male taper.

The coupler body 161 may further define a coupler molding surface 175. The coupler molding surface 175 is defined between the upper annular face 164 and an inside cylindrical surface 172 of the collar 161A. The coupler molding surface 175 provides, in use, a corner portion of the molding cavity that defines a portion of a top-sealing surface of the preform.

The coupler member 160 may also include an annular vent groove 169 that is defined on the coupler body 161 around a medial portion of an inside cylindrical surface 172 of the collar 161A. The inside cylindrical surface 172 is configured cooperate, in use, with an upper-outer cylindrical surface 182 of the core body 181 to define a vent gap therebetween. Further, a vent channel 168 may be defined through the coupler body 161 between an outer surface 152 of the coupler body 161 and intersecting with the annular vent groove 169.

The coupler member 160 may also include a nozzle 178 that is defined through the coupler body 161 between the upper annular face 164 and intersecting with a coupler pressure channel 179. The coupler pressure channel 179 is defined through the coupler body 161 between a bottom annular face 170 of the coupler body 161 and intersecting with the nozzle 178 within the coupler body 161.

As shown, the support body 151 may also have a tubular form. The support body 151 may further include a support pressure channel 154 that is defined as a groove that passes through both a portion of a top annular surface 155 of the support body 151 and an inner circumferential surface 156 of the support body 151. The support pressure channel 154 is configured to connect, in use, an annular pressure channel that is provided in a core clearance 107, that is defined between the support body 151 and the core body 181, with the coupler pressure channel 179 of the coupler member 160. The annular pressure channel is in turn connectable to a source of compressed air via a connecting pressure channel 105. The connecting pressure channel 105 is defined through a lower portion of the support body 151. In operation, compressed air may be forced through the nozzle 178 to assist with ejection of the preform from the core insert 180.

The coupler member 160 may also include a coupler-alignment member interface 167 that is defined in the coupler body 161 as a further cylindrical surface of a shallow bore formed through the bottom annular face 170. Likewise, the support body 151 may further include a support-alignment member interface 153 that is defined in the coupler body 161 as a cylindrical surface of a shallow bore formed through a top surface of the support body 151. The coupler-alignment member interface 167 and the support-alignment member interface 153 are configured to cooperate, in use, with a complementary interface of an outer cylindrical surface of an alignment pin. At least one of the coupler-alignment member interface 167 and the support-alignment member interface 153 may be configured to provide a gap in relation to the complementary interface. The gap may be selected to provide a loose angular alignment is established between the coupler member 160 and the support member 150 that is sufficient to align an inlet of the coupler pressure channel 179, on the bottom annular face 170, with the support pressure channel 154 of the support member 150. In addition, the gap may be selected such that it accommodates the lateral move S1, in use, between the support-sliding interface 199 and the complementary sliding interface 198.

The complementary sliding interface 198 may include a coupler-support interface 177 that is defined on the coupler body 161. The coupler-support interface 177 may include a bottom annular face 170 of the coupler body 161. Likewise, the support-sliding interface 199 includes a support-coupler sliding interface 159. The support-coupler sliding interface 159 includes a first portion of a top annular surface 155 of the support body 151.

The complementary sliding interface 198 may alternatively, or additionally, include a core-support interface 196 that is defined on the core body 181. The core-support interface 196 may include a bottom annular face 188 of the flange 181A. Likewise, the support-sliding interface 199 includes a support-core sliding interface 197. The support-core sliding interface 197 includes a second portion of a top annular surface 155 of the support body 151.

The support body 151 may further include a compensating portion 158. The compensating portion 158 is defined in the support body 151 and in the example being presented herein comprises a conical spring member, which in the cross section depicted in FIG. 2 is a generally S-shaped groove. The compensating portion 158 is positioned in between the support-coupler sliding interface 159 and a bottom annular surface of the support body 151. Generally speaking, the purpose of the compensating portion 158 is to allow a degree of axial flexibility to the support body 151. The degree of axial flexibility allows to compensate for the mis-alignment of the mold inset stack components. Accordingly, the dimension of the compensating portion 158 is selected such that to provide the degree of flexibility to the support body 151, while providing operational stability, while in use. For the avoidance of doubt, the term "operational stability" as used herein above and herein below is meant to define an operational state between various components of the mold insert stack 100 which is suitable for proper operation of the mold insert stack 100, i.e. injection of melt under pressure of formation of the preform.

With the inclusion of the compensating portion 158, the core body 181 may be further configured such as to define a core-support interface 191. The core-support interface 191 may be formed on an outer cylindrical surface 189 of a lower portion of the core body 181. Likewise, a support-core interface 106 may be defined on the support body 151. The support-core interface 106 may be formed on an inside circumferential surface of a lower portion of the support body 151. The core-support interface 191 and the support-core interface 106 are also located beneath the core clearance 107 that is defined between the support body 151 and the core body 181. The core-support interface 191 and the support-core interface 106 are configured to cooperate, in use, to provide a generally loose alignment between the core body 181 and the support body 151. In executing the foregoing a small diametrical gap may be provided between the core-support interface 191 and the support-core interface 106.

As shown with reference to FIG. 2, a shallow pocket 157 may be formed through a bottom face of the support body 151. The core assembly 108 further includes a retainer 200 that is received in a complementary seat formed in the core body 181. In operation, a face of the shallow pocket 157 cooperates with a face of a retainer 200 to retain the core body 181 within the support body 151.

It can be said that a combination of the core clearance 107, the sliding interface and the compensating portion 158 permits the core body 181 to move relative to the support body 151 in a direction depicted in FIG. 2 as "S1" (i.e. lateral move) and a direction "S2" (i.e. axial move). More specifically, the core clearance 107 and/or the sliding interface 210 allow for the lateral move and the compensating portion 208 allows for the axial move.

Advantageously, the coupler body 161 may be formed of a first material with an associated first conditioning to impart to the coupler body 161 a first hardness value. Likewise, the core body 181 may be formed of a second material with an associated second conditioning to impart to the core body 181 a second hardness value. Advantageously, the first hardness value being less than the second hardness value the coupler body 161 is forced to wear faster than the core body 181. Whereby, the coupler body 161 being a much simpler component to manufacture relative to the core body 181, and thus less expensive, may be more economically replaced.

In accordance with another non-limiting embodiment, not shown, the mold insert stack 100 may be configured as described hereinbefore but without the split mold insert pair 140. The mold insert stack, so configured, would define a molding cavity for forming, by example, a preform without a neck finish. In such a mold insert stack the coupler member 160 may be configured as described hereinbefore with the exception that the coupler-insert interface 163 would be configured to cooperate with the cavity-insert interface 133 of the cavity insert 110.

Description of the embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

What is claimed is:

1. A mold insert stack for use in an injection mold, comprising:
a core assembly that includes:
a core insert that includes:
a core body;
an inner molding surface that is defined on the core body, the inner molding surface provides, in use, an inner portion of a molding cavity that is shaped to mold a preform;
a core-coupler interface that is defined on the core body;
a support member that includes:
a support body;
a support-sliding interface that is defined on the support body;
a coupler member that includes:
a coupler body;
a coupler-core interface that is defined on the coupler body;
a coupler-insert interface that is defined on the coupler body; and
a complementary sliding interface that is defined on at least one of the coupler body and the core body;
the coupler-core interface and the core-coupler interface being configured to cooperate, in use, to mutually locate the coupler body with the core body;
the coupler-insert interface being configured to cooperate, in use, with a complementary interface defined on a further mold insert;
the support-sliding interface and the complementary sliding interface being configured to cooperate, in use, to establish a slidable coupling that is able to accommodate, in use, a lateral move (S1) between the support-sliding interface and the complementary sliding interface and connect a load path between the support body with at least one of the core body with the coupler body.

2. The mold insert stack of claim 1, further comprising:
a cavity insert that includes:
a cavity body;
a cavity molding surface that is defined on the cavity body, the cavity molding surface defines an outer portion of the molding cavity;
a cavity-insert interface that is defined, at least in part, on the cavity body;
the further mold insert is the cavity insert, and wherein the complementary interface is the cavity-insert interface.

3. The mold insert stack of claim 1, further comprising:
a split mold insert pair that includes:
a pair of split bodies;
a split molding surface that is defined on the pair of split bodies, the split molding surface defines a neck finish portion of the molding cavity;
a split-coupler interface that is defined on the pair of split bodies;
a split-cavity interface that is defined on the pair of split bodies;
a cavity insert that includes:
a cavity body;
a cavity molding surface that is defined on the cavity body, the cavity molding surface defines an outer portion of the molding cavity;
a cavity-insert interface that is defined, at least in part, on the cavity body;
the further mold insert is the split mold insert pair, and wherein the complementary interface is the split-coupler interface;
the coupler-insert interface and the split-coupler interface are configured to cooperate, in use, to mutually locate the coupler body and the pair of split bodies;
the split-cavity interface and the cavity-insert interface are configured to cooperate, in use, to mutually locate the pair of split bodies with the cavity body.

4. The mold insert stack of claim 3, further comprising:
a cavity retainer that includes:
   a retainer body;
   the retainer body configured to cooperate, in use, with the cavity body and a cavity plate of the injection mold for retaining the cavity body in the cavity plate;
a further portion of the cavity-insert interface is defined on the retainer body.

5. The mold insert stack of claim 1, wherein:
the coupler body has an annular form;
the coupler body includes a collar that projects inwardly from an inner cylindrical surface thereof; and
the coupler-core interface includes:
   the inner cylindrical surface of the coupler body; and
   a lower annular face of the collar that is between the inner cylindrical surface and an inside cylindrical surface of the collar;
the core body has a cylindrical form;
the core body includes a flange that projects outwardly from an outer cylindrical surface thereof; and
the core-coupler interface includes:
   an outside cylindrical surface of the flange; and
   a top annular face of the flange.

6. The mold insert stack of claim 5, wherein:
a retainer interface is defined through the coupler body between an outer surface of the coupler body and the inner cylindrical surface;
a core-retainer interface is defined on the outside cylindrical surface of the flange;
the retainer interface being configured to cooperate, in use, with a further interface on a retainer to releasably position a face of the retainer in a securing configuration with respect to the core-retainer interface, whereby the retainer secures the coupler member with the core insert.

7. The mold insert stack of claim 6, wherein:
a plurality of the retainer interface are defined through the coupler body, the plurality of the retainer interface being arranged in an angularly-spaced relation around the coupler body; and
a plurality of the core-retainer interface are defined on the outside cylindrical surface of the flange, the plurality of the core-retainer interface being arranged in the angularly-spaced relation of the plurality of the retainer interface.

8. The mold insert stack of claim 1, wherein:
the coupler body has an annular form; and
the coupler body includes a collar that projects inwardly from an inner cylindrical surface thereof; and
the coupler-insert interface defines a core lock that includes:
   a top annular face of the coupler body;
   a semi-conical surface of the coupler body, the semi-conical surface that inwardly diverges from the top annular face to define a female taper; and
   an upper annular face of the collar.

9. The mold insert stack of claim 8, wherein:
a coupler molding surface is further defined between the upper annular face and an inside cylindrical surface of the collar, the coupler molding surface provides, in use, a corner portion of the molding cavity that defines a portion of a top-sealing surface of the preform.

10. The mold insert stack of claim 8, wherein:
an annular vent groove is defined on the coupler body around a medial portion of an inside cylindrical surface of the collar;
the inside cylindrical surface is configured cooperate, in use, with an upper-outer cylindrical surface of the core body to define a vent gap therebetween;
a vent channel is defined through the coupler body between an outer surface of the coupler body and intersecting with the annular vent groove.

11. The mold insert stack of claim 8, wherein:
a nozzle is defined through the coupler body between the upper annular face and intersecting with a coupler pressure channel;
the coupler pressure channel is defined through the coupler body between a bottom annular face of the coupler body and intersecting with the nozzle within the coupler body;
the support body has a tubular form; and
a support pressure channel is defined as a groove that passes through both a portion of a top annular surface of the support body and an inner circumferential surface of the support body;
the support pressure channel configured to connect, in use, an annular pressure channel provided by a core clearance, that is defined between the support body and the core body, with the coupler pressure channel;
a connecting pressure channel is defined through a lower portion of the support body.

12. The mold insert stack of claim 11, wherein:
a coupler-alignment member interface is defined in the coupler body as a cylindrical surface of a shallow bore formed through the bottom annular face; and
a support-alignment member interface is defined in the coupler body as a further cylindrical surface of a bore formed through a top surface of the support body;
the coupler-alignment member interface and the support-alignment member interface configured to cooperate, in use, with a further interface of an outer cylindrical surface of an alignment pin;
at least one of the coupler-alignment member interface and the support-alignment member interface is configured to provide a gap in relation to the complementary interface;
whereby a loose angular alignment is established between the coupler member and the support member that is sufficient to align an inlet of the coupler pressure channel, on the bottom annular face, with the support pressure channel of the support member, and, wherein the lateral move (S1), in use, between the support-sliding interface and the complementary sliding interface is accommodated.

13. The mold insert stack of claim 1, wherein:
the coupler body has an annular form; and
the coupler-insert interface defines a cavity lock that includes:
   a top annular face of the coupler body;
   a semi-conical surface of the coupler body, the semi-conical surface of the coupler body that outwardly diverges from the top annular face to define a male taper; and
   an upper annular face of the coupler body between the semi-conical surface and an outer surface of the coupler body.

14. The mold insert stack of claim 1, wherein:
the complementary sliding interface includes a coupler-support interface that is defined on the coupler body;
the coupler body has an annular form; and
the coupler-support interface includes a bottom annular face of the coupler body;
the support body has a tubular form;
the support-sliding interface includes a support-coupler sliding interface; and the support-coupler sliding interface includes a first portion of a top annular surface of the support body.

15. The mold insert stack of claim 14, wherein:
the support body includes a compensating portion;
the compensating portion includes a generally S-shaped groove formed around the support body.

16. The mold insert stack of claim 15, wherein:
the generally S-shaped groove is positioned in between the support-coupler sliding interface and a bottom annular surface of the support body.

17. The mold insert stack of claim 15, wherein:
a core-support interface is defined on an outer cylindrical surface of a lower portion of the core body;
a support-core interface is defined on an inside circumferential surface of the support body;
the core-support interface and the support-core interface being further located beneath a core clearance that is defined between the support body and the core body;
the core-support interface and the support-core interface being configured to cooperate, in use, to loosely align the core body with the support body.

18. The mold insert stack of claim 1, wherein:
the complementary sliding interface includes a core-support interface that is defined on the core body;
the core body has a cylindrical form;
the core body includes a flange that projects outwardly from an outer cylindrical surface thereof; and
the core-support interface includes a bottom annular face of the flange;
the support body has a tubular form;
the support-sliding interface includes a support-core sliding interface; and
the support-core sliding interface includes a second portion of a top annular surface of the support body.

19. The mold insert stack of claim 1, wherein:
the coupler body is formed of a first material with an associated first conditioning to impart to the coupler body a first hardness value;
the core body is formed of a second material with an associated second conditioning to impart to the core body a second hardness value;
the first hardness value being less than the second hardness value.

20. A coupler member of a mold insert stack for use in an injection mold, comprising:
a coupler body;
a coupler-core interface that is defined on the coupler body;
a coupler-insert interface that is defined on the coupler body; and
a coupler-support interface that is defined on the coupler body, the coupler-support interface provides at least a portion of a complementary sliding interface;
the coupler-core interface and a core-coupler interface that is defined on a core body of a core insert, being configured to cooperate, in use, to mutually locate the coupler body with the core body;
the coupler-insert interface being configured to cooperate, in use, with a complementary interface defined a further mold insert;
the coupler-support interface and a support-core sliding interface, that is defined on a support body of a support member, being configured to cooperate, in use, to establish a slidable coupling that is able to accommodate, in use, a lateral move (S1) between the coupler-support interface and the support-core sliding interface and connect a load path between the support body and the coupler body.

21. The coupler member of claim 20, wherein:
the further mold insert is a cavity insert, and wherein the complementary interface is a cavity-insert interface.

22. The coupler member of claim 20, wherein:
the further mold insert is a split mold insert pair, and wherein the complementary interface is a split-coupler interface;
the coupler-insert interface and the split-coupler interface are configured to cooperate, in use, to mutually locate the coupler body and a pair of split bodies of the split mold insert pair.

23. The coupler member of claim 20, wherein:
the coupler body has an annular form;
the coupler body includes a collar that projects inwardly from an inner cylindrical surface thereof; and
the coupler-core interface includes:
the inner cylindrical surface of the coupler body; and
a lower annular face of the collar that is between the inner cylindrical surface and an inside cylindrical surface of the collar.

24. The coupler member of claim 23, wherein:
a retainer interface is defined through the coupler body between an outer surface of the coupler body and the inner cylindrical surface;
the retainer interface being configured to cooperate, in use, with a further interface on a retainer to releasably position a face of the retainer in a securing configuration with respect to a core-retainer interface that is defined on the core body, whereby the retainer secures the coupler member with the core insert.

25. The coupler member of claim 24, wherein:
a plurality of the retainer interface are defined through the coupler body, the plurality of the retainer interface being arranged in an angularly-spaced relation around the coupler body.

26. The coupler member of claim 20, wherein:
the coupler body has an annular form; and
the coupler body includes a collar that projects inwardly from an inner cylindrical surface thereof; and
the coupler-insert interface defines a core lock that includes:
a top annular face of the coupler body;
a semi-conical surface of the coupler body, the semi-conical surface that inwardly diverges from the top annular face to define a female taper; and
an upper annular face of the collar.

27. The coupler member of claim 26, wherein:
a coupler molding surface is further defined between the upper annular face and an inside cylindrical surface of the collar, the coupler molding surface provides, in use, a corner portion of a molding cavity that defines a top-sealing surface of a preform, at least in part.

28. The coupler member of claim 26, wherein:
an annular vent groove is defined on the coupler body around a medial portion of an inside cylindrical surface of the collar;
the inside cylindrical surface is configured cooperate, in use, with an upper-outer cylindrical surface of the core body to define a vent gap therebetween;
a vent channel is defined through the coupler body between an outer surface of the coupler body and intersecting with the annular vent groove.

29. The coupler member of claim 26, wherein:
a nozzle is defined through the coupler body between the upper annular face and intersecting with a coupler pressure channel;

the coupler pressure channel is defined through the coupler body between a bottom annular face of the coupler body and intersecting with the nozzle within the coupler body.

30. The coupler member of claim 29, wherein:
a coupler-alignment member interface is defined in the coupler body as a cylindrical surface of a shallow bore formed through the bottom annular face; and
the coupler-alignment member interface and a support-alignment member interface, are defined in the support body, are configured to cooperate, in use, with a further interface of an outer cylindrical surface of an alignment pin;
at least one of the coupler-alignment member interface and the support-alignment member interface is configured to provide a gap in relation to the complementary interface;
whereby a loose angular alignment is established between the coupler member and the support member that is sufficient to align an inlet of the coupler pressure channel, on the bottom annular face, with a support pressure channel of the support member, and, wherein the lateral move (S1) between the coupler-support interface and the support-core sliding interface is accommodated.

31. The coupler member of claim 20, wherein:
the coupler body has an annular form; and
the coupler-insert interface defines a cavity lock that includes:
a top annular face of the coupler body;
a semi-conical surface of the coupler body, the semi-conical surface of the coupler body outwardly that diverges from the top annular face to define a male taper; and
an upper annular face of the coupler body between the semi-conical surface and an outer surface of the coupler body.

32. The coupler member of claim 20, wherein:
the coupler body is formed of a first material with an associated first conditioning to impart to the coupler body a first hardness value that is less than a second hardness value associated with the core body.

* * * * *